(12) United States Patent
Van Den Bossche

(10) Patent No.: US 12,728,599 B2
(45) Date of Patent: Sep. 8, 2026

(54) ADDITIVE MANUFACTURING MONITORING METHOD AND SYSTEM

(71) Applicant: GRINDOSONIC BV, Leuven (BE)

(72) Inventor: Alex Van Den Bossche, Neerijse (BE)

(73) Assignee: GRINDOSONIC BV, Leuven (BE)

( * ) Notice: Subject to any disclaimer, the term of this patent is extended or adjusted under 35 U.S.C. 154(b) by 394 days.

(21) Appl. No.: 18/270,958

(22) PCT Filed: Jan. 7, 2022

(86) PCT No.: PCT/EP2022/050237
§ 371 (c)(1),
(2) Date: Jul. 5, 2023

(87) PCT Pub. No.: WO2022/148827
PCT Pub. Date: Jul. 14, 2022

(65) Prior Publication Data

US 2024/0300184 A1 Sep. 12, 2024

(30) Foreign Application Priority Data

Jan. 7, 2021 (EP) .................................... 21150518

(51) Int. Cl.
*B29C 64/393* (2017.01)
*B33Y 50/02* (2015.01)

(52) U.S. Cl.
CPC ............. *B29C 64/393* (2017.08); *B33Y 50/02* (2014.12)

(58) Field of Classification Search
CPC ...... B29C 64/393; B33Y 50/02; G01N 29/12; G01N 29/045; G01N 2291/014; G01N 2291/0231; G01N 2291/0289
See application file for complete search history.

(56) References Cited

U.S. PATENT DOCUMENTS 6,782,970 B2 8/2004 Chang
10,857,735 B1 12/2020 Martin et al.
(Continued)

FOREIGN PATENT DOCUMENTS

CN 111272872 A 6/2020
EP 3309544 A1 4/2018
(Continued)

OTHER PUBLICATIONS

Panteliou et al. ("Damping Factor as an Indicator of Crack Severity" from "Journal of Sound and Vibration (2001) 241(2), 235-245") (Year: 2001).*
Japanese Office Action from Corresponding Japanese Patent Application No. JP2023-541300, Jul. 22, 2025.
Huang et al., "Time Domain Doppler Estimators of the Amplitude of Vibrating Targets", Journal of the Acoustical Society of America, vol. 91, No. 2, Feb. 1, 1992, pp. 965-974.
(Continued)

*Primary Examiner* — Yuhui R Pan
(74) *Attorney, Agent, or Firm* — WORKMAN NYDDEGER

(57) ABSTRACT

The present invention concerns a method for non-destructively detecting deviating additive manufacturing (AM) process behaviour of a 3D printed solid piece, comprising the steps of: providing an impact to the solid piece, preferably a mechanical impact; obtaining a vibrational response of the solid piece to the impact in the frequency domain; extracting a set of eigenfrequencies, and optionally attenuations, from the vibrational response, each of said eigenfrequencies corresponding to a vibrational mode of said solid piece; obtaining for at least one vibrational mode: an eigenfrequency shift by comparing one of the set of extracted eigenfrequencies corresponding to said vibrational mode to a reference eigenfrequency value of said vibrational mode, thereby detecting the deviating AM process behaviour.

14 Claims, 6 Drawing Sheets

(56) References Cited

U.S. PATENT DOCUMENTS

| | | | |
|---|---|---|---|
| 11,913,097 B2 | 2/2024 | Nishida et al. | |
| 2017/0028703 A1* | 2/2017 | Xu | F01D 11/08 |
| 2018/0101167 A1 | 4/2018 | Dehghanniri et al. | |
| 2019/0011402 A1 | 1/2019 | Kinoshita et al. | |
| 2019/0234908 A1 | 8/2019 | Meile et al. | |
| 2020/0057030 A1* | 2/2020 | Hartwig | G01N 29/043 |

FOREIGN PATENT DOCUMENTS

| | | | |
|---|---|---|---|
| EP | 3435044 | A1 | 1/2019 |
| EP | 3658868 | A1 | 6/2020 |
| JP | S58127162 | A | 7/1983 |
| JP | 2014211333 | A | 11/2014 |
| JP | 2018086836 | A | 6/2018 |
| JP | 2018200198 | A | 12/2018 |
| WO | 2017145850 | A1 | 8/2017 |
| WO | 2020241530 | A1 | 12/2020 |
| WO | 2020254698 | A1 | 12/2020 |

OTHER PUBLICATIONS

Mandelshtam et al., “Harmonic Inversion of Time Signals and its Applications”, The Journal of Chemical Physics, vol. 107, No. 17, Nov. 1, 1997, pp. 6756-6769.

Taheri, Hossein, “Nondestructive Evaluation and In-Situ Monitoring for Metal Additive Manufacturing”, Iowa State University Digital Depository, as early as Jan. 1, 2018, 161 pages.

Tapson, “High Precision, Short Range Ultrasonic Sensing by Means of Resonance Mode-Locking”, Ultrasonics, vol. 33, Issue 6, Nov. 1, 1995, pp. 441-444.

Extended European Search Report from corresponding European Patent Application No. 21150518.5, Jun. 25, 2021.

International Search Report from corresponding PCT Application No. PCT/EP2022/050237, Apr. 4, 2022.

Kazys et al., “Ultrasonic Technique for Vibration Measurements”, NDT.net, Proceedings of the 15th World Conference on Non-Destructive Testing, Oct. 15-21, 2000, 4 pages, retrieved from https://www.ndt.net/article/wcndt00/papers/idn246/idn246.htm.

* cited by examiner

ADDITIVE MANUFACTURING MONITORING METHOD AND SYSTEM

TECHNICAL FIELD

The present invention relates to a non-destructive method for monitoring an additive manufacturing process with respect to porosity, sinter quality, elasticity, microcellular clustering, defects, etc. Hereby deviating process behaviour can be timely observed and optionally corrected. The present invention also relates to a method for calibrating an additive manufacturing apparatus, e.g. by compensation of the deviating process behaviour. The present invention also pertains to the field of non-destructive testing methods and systems by impact excitation measurement methods and systems. The present invention allows measuring the amount of microcracks in a work piece, thereby allowing a qualitative and quantitative assessment of long-term structural weaknesses in the work piece.

BACKGROUND

Additive manufacturing (AM), also called three-dimensional or 3D printing, is a process which has gained a lot of momentum in recent years. It allows construction of a three-dimensional object from a CAD model or a digital 3D model. Hereby, material can be deposited, joined or solidified under control conditions to create a three-dimensional object, with material being added together, such as liquid molecules or powder grains being fused together, typically layer by layer. The precision, repeatability, and material range of 3D printing have increased to the point that some 3D printing processes are considered viable as an industrial-production technology. One of the key advantages of 3D printing is the ability to produce very complex shapes or geometries that would be otherwise impossible to construct by hand, including hollow parts or parts with internal truss structures to reduce weight.

In many cases it is necessary to ensure that 3D printed pieces meet required quality standards and that anomalies can be detected and characterized. It is thus important to have metrology tools for mechanical property evaluation and for appropriate anomaly detection, quality control, and monitoring.

Knowledge of when various types of deviations of quantities from the expected values appear, will increase the potential for early detection of significant flaws in additively manufactured parts and offers the potential opportunity for in-process intervention and to hence decrease the time and cost of repair or rework. Because the AM process involves incremental deposition of material, it gives unique opportunities to monitor the material quality as it is deposited. To meet this need there are a variety of sensing methods and signals which can be measured. Among the available measurement modalities, acoustic-based methods have the advantage of potentially providing real-time, continuous in-service monitoring of manufacturing processes at relatively low cost.

The Ph.D. thesis of Taheri, Hossein, "Nondestructive evaluation and in-situ monitoring for metal additive manufacturing" (2018). Graduate Theses and Dissertations Iowa State University, 16675, discloses a manner of monitoring an AM method in-situ. A proof-of-concept demonstration for acoustic measurements used for monitoring both machine and material state is demonstrated. The analyses have been performed on temporal and spectral features extracted from the acoustic signals. These features are commonly related to defect formation, and acoustic noise that is generated and can potentially characterize the process. A novel application of signal processing tools is used for identification of temporal and spectral features in the acoustic signals. This method concerns obtaining acoustic measurements during the AM process, and trying to extract information therefrom. It seems to involve an intricate analysis, which may depend highly on the exact manufacturing method and the material used.

Document US 2019/234908 A1 discloses an object analysis comprising measuring a frequency-dependent natural oscillation behavior of the object by dynamically-mechanically exciting the object in a defined frequency range (f) by means of generating a body oscillation by applying a test signal, and detecting a body oscillation generated in the object on account of the exciting. Moreover, the method involves simulating a frequency-dependent natural oscillation behavior for the object by generating a virtual digital representation of the object, and carrying out a finite element analysis on the basis of the virtual representation comprising dynamically exciting, in a simulated manner, the virtual representation into a virtual frequency range for generating a virtual body oscillation, calculating the virtual body oscillation generated in the object on account of the exciting in a simulated manner, and deriving an object state on the basis of a comparison of the measured natural oscillation behavior and the simulated frequency-dependent natural oscillation behavior.

Document EP3309544A1 discloses a method for in-process monitoring of a 3D manufacturing apparatus or quality control of a 3D manufactured structure. The method includes a generating step that generates an acoustic wave in the 3D manufactured structure. A receiving step receives the acoustic wave with a microphone array. An analyzing step analyzes a frequency spectrum of the acoustic wave. A determining step determines if the frequency spectrum indicates a defect in the 3D manufactured structure.

Document US 2020/057030 A1 discloses a system and method for the non-destructive testing of additively manufactured parts. An input mechanism excites with an excitation force (e.g., a vibration) an additive manufacturing build structure, which includes a part on a build platform, to induce a dynamic response in the part. An output mechanism (e.g., a non-contact transducer) senses the induced dynamic response in the part. A processor determines and examines the relationship between the response and excitation to identify an indication of a defect in the part, and communicates an alert if the indication is identified. The processor may compare the phase, magnitude, coherence, or time delay of the relationship to a reference relationship and/or may compare the modal frequency or the modal damping to a reference to identify a deviation greater than a pre-established threshold.

Document EP3658868A1 discloses an apparatus for analyzing a mechanical vibratory response of a solid material sample, the apparatus comprising: an array of impactors arranged to impart an impact on respective well-defined points on the surface of said solid material sample; a sensor configured to capture said mechanical vibratory response as a time-varying signal, subsequent to an impact of said at least one impactor; and processing means configured to analyze said time-varying signal to determine the frequencies and decay constants of sinusoids making up said time-varying signal. The invention also pertains to a corresponding method of characterizing a solid material sample.

Document WO2020254698A1 discloses a method for acoustically measuring material properties of a test piece at high temperatures, comprising the steps of: a. heating the test piece to within a testing temperature range; b. performing a background measurement within said testing temperature range by capturing a vibrational signal from the test piece within a calibration period, thereby obtaining a noise signal; c. performing an acoustic measurement on said test piece within said testing temperature range and within a testing period by: c1. imparting a vibrational excitation onto the test piece; c2. capturing a vibrational signal of the test piece within the testing period. thereby obtaining a vibrational response signal to said vibrational excitation, and d. obtaining the material properties of the test piece by analysing the vibrational response signal, thereby taking into account the noise signal. The present invention also concerns a system for acoustically measuring material properties of a test piece at high temperatures.

Both of the latter prior art documents in name of the current applicant are concerned with methods and apparatuses for performing the impact excitation (IE) measurements. The IE technique basically consists of providing an impact to a work piece and obtaining and analysing the vibrational response signal. This signal is also referred to as an acoustic response signal. The response signal can be captured via a number of ways, including by using a microphone, a piezoelectric displacement sensor and/or a laser interferometer.

Using IE measurements, work pieces can be non-destructively tested for assessing the quality of the work piece in a quantitative way. This can be used for work pieces of all types of materials: metals, alloys, polymers, ceramics, or any combination thereof. IE measurements, and in particular the present invention, seem particularly useful for characterizing 3D-printed work pieces, also called additively manufactured work pieces. In such work pieces, the additive manufacturing (AM) process may lead to inhomogeneities with respect to the quality of the work piece, i.e. some regions of the work piece may be of lesser quality than other regions.

The quality of a work piece, and in particular a 3D printed work piece, can be characterized by measuring the porosity of the work piece. Typically a higher porosity is indicative of more defects, and can be indicative of a lower quality work piece. Porosity can be measured using tomography, e.g. X-ray micro-computed tomography (CT). X-ray micro-CT has the advantage of recreating a full 3D model of a scanned object, allowing a non-destructive inspection of internal features or defects. However, X-ray micro-CT is an expensive and time-consuming measuring method. Furthermore, the inventors have found that X-ray micro-CT cannot resolve all types of quality-decreasing structural properties. For instance, micro-CT does not have a good sensitivity for detecting microcracks. Hence, the present invention aims to provide a method wherein one can obtain a quality assessment of an AM work piece with respect to both porosity and microcracks in a single measurement or at least with a single measurement setup.

The present invention aims to overcome the above mentioned and other problems. The present invention hereto provides a method for monitoring an additive manufacturing process which is easier to use and/or implement than prior art methods and which allows precise measurements of deviating AM process behaviour on the basis of acoustic measurements.

SUMMARY OF THE INVENTION

The present invention concerns a method for non-destructively detecting deviating additive manufacturing (AM) process behaviour of a 3D printed solid piece, comprising the steps of:

providing an impact to the solid piece, preferably a mechanical impact;

obtaining a vibrational response of the solid piece to the impact in the frequency domain;

extracting a set of eigenfrequencies, and optionally attenuations, from the vibrational response, each of said eigenfrequencies corresponding to a vibrational mode of said solid piece;

obtaining for at least one vibrational mode:

an eigenfrequency shift by comparing one of the set of extracted eigenfrequencies corresponding to said vibrational mode to a reference eigenfrequency value of said vibrational mode and preferably obtaining a porosity value of the solid piece from said eigenfrequency shift, thereby detecting the deviating AM process behaviour.

Preferably hereby, a set of attenuations are also extracted from the vibrational response, each of said attenuations corresponding to an eigenfrequency of said set of eigenfrequencies. These attenuations can be extracted for at least one and preferably each of the eigenfrequencies. Thereby, for at least one eigenfrequency, at least one damping parameter is computed from an attenuation corresponding to said eigenfrequency, thereby obtaining a microcrack quantity value of the solid piece which allows detecting deviating AM process behaviour which is not detected by the eigenfrequency shift alone. Hereby, an attenuation relates to how a certain eigenfrequency echoes after the impact has been provided to the solid piece, and in particular to how long after the impact said eigenfrequency can still be seen in the vibrational response. The attenuation can be extracted from the time domain response of the vibrational response and/or from the frequency domain response of the vibrational response, preferably from the frequency domain response. A damping parameter, also referred to as a damping coefficient, can be computed from the attenuation. Typically, attenuation can be quantified by looking at the eigenfrequency peak in the frequency spectrum of the vibrational response. Preferably, a damping parameter is related to a width of the eigenfrequency peak in the vibrational response, e.g. the width of the eigenfrequency peak at half maximum. Alternatively or additionally, a damping parameter can be related to the shape of the eigenfrequency peak in the vibrational response, e.g. a skew damping parameter and/or a kurtosis parameter.

The inventors have found that the eigenfrequency shift thus obtained relates directly to the porosity of the solid piece, which on its turn relates to the amount of voids comprising a medium-sized and large-sized radius. Further, the inventors have found that the damping parameter of an eigenfrequency is intimately related to the amount of microcracks within the solid piece, which on its turn is related to the durability of the solid piece, i.e. the long-term strength. Note that microcracks are essentially linear in structure, and therefore do not significantly contribute to the porosity of the solid piece. The present invention, however, allows to obtain information on both porosity and microcracks in a single measurement and/or with a single measurement setup, and thus also allows obtaining a quantitative assessment of the quality of the solid piece based on the eigenfrequency shift and the damping parameter. This quantitative assessment also applies to the AM method used to make the solid piece. The quantitative assessment may be preferably made by a scoring algorithm, which computes a score depending on the values of the one or more eigenfrequency shifts and the one or more damping parameters, and optionally dependent on a set of threshold values which preferably are selected to ensure a minimum quality of the solid piece.

The present invention also concerns a system for non-destructively detecting deviating additive manufacturing (AM) process behaviour of a 3D printed solid piece, comprising:

- an impactor, preferably a mechanical impactor, for providing an impact to a solid piece;
- a sensor for obtaining a vibrational response of the solid piece to the impact;
- processing means configured to:
  - compute the vibrational response in the frequency domain;
  - extracting a set of eigenfrequencies, and optionally attenuations, from the vibrational response, each of said eigenfrequencies corresponding to a vibrational mode of said solid piece;
  - obtaining for at least one vibrational mode: an eigenfrequency shift by comparing one of the set of extracted eigenfrequencies corresponding to said vibrational mode to a reference eigenfrequency value of said vibrational mode and preferably obtaining a porosity value of the solid piece from said eigenfrequency shift, thereby detecting the deviating AM process behaviour.

Preferably, the processing means is configured to obtain a set of attenuations from the vibrational response, each of said attenuations corresponding to an eigenfrequency of said set of eigenfrequencies. These attenuations can be extracted for at least one and preferably each of the eigenfrequencies. Thereby the processing means is configured, for at least one eigenfrequency, to compute at least one damping parameter from an attenuation corresponding to said eigenfrequency, thereby obtaining a microcrack quantity value of the solid piece.

Patent application EP 3 435 044 A1 discloses an apparatus for analyzing a mechanical vibratory response of a solid material sample, the apparatus comprising: at least one impactor arranged to impart an impact on respective well-defined points on the surface of said solid material sample; a sensor configured to capture said mechanical vibratory response as a time-varying signal, subsequent to an impact of said at least one impactor; and processing means configured to analyze said time-varying signal to determine the frequencies and decay constants of sinusoids making up said time-varying signal. The invention also pertains to a corresponding method of characterizing a solid material sample. The method and apparatus described in this document can be used to perform the measurement of the vibrational response of the solid piece to the impact.

In a further aspect, the present invention concerns a method for calibrating a 3D printing apparatus, comprising the steps of:

a) forming a set of solid pieces on a printing plate by 3D printing;
b) detecting deviating process behaviour in any of the solid pieces using a method as described above, thereby obtaining positional information of said deviating process behaviour;
c) calibrating the 3D printing apparatus taking into account the positional information of the deviating process behaviour on the 3D printing apparatus.

The present invention also relates to a 3D printing steering method, comprising performing the calibration method on a set of at least one solid piece at multiple measurement events during forming of the solid piece, whereby the reference eigenfrequency value at each measurement event is a predefined target reference eigenfrequency for said measurement event, and whereby processing parameters of the 3D printing apparatus are steered on the basis of the eigenfrequency shift.

In a preferred embodiment, the vibrational response is obtained by an acoustic sensor. The acoustic sensor may be in contact with the solid piece or may be positioned at a distance from the solid piece. Preferably, within the present invention, the acoustic sensor is positioned at a distance from the solid piece. This allows in-situ and in-process monitoring without having the difficulty of ensuring that the acoustic sensor is in contact with the solid piece under construction.

In a preferred embodiment, the method is applied in-situ. Hereby, preferably the method is applied during the additive manufacturing process. This allows in-situ monitoring of the AM process in real time, which can help in identifying during which parts of the AM process the deviating behaviour occurs. If the AM process comprises printing the solid piece layer by layer, the in-situ monitoring also allows locating where a defect may occur in the solid piece. It also may allow steering the AM process.

BRIEF OVERVIEW OF THE FIGURES

FIG. 1 schematically illustrates an embodiment of the apparatus according to the present invention.

A preferred embodiment of an apparatus for analyzing a mechanical vibratory response of a solid material sample is illustrated in FIG. 2.

FIGS. 3*a* and 3*b* illustrate a method according to the present invention being performed on a solid piece being 3D printed.

DETAILED DISCUSSION OF THE INVENTION

The present invention relates to a method and system for non-destructively detecting deviating additive manufacturing (AM) process behaviour of a 3D printed solid piece as specified before and in the claims and which is further specified in this document.

The detection method comprises the steps of providing an impact to the solid piece, preferably a mechanical impact; obtaining a vibrational response of the solid piece to the impact in the frequency domain; extracting a set of eigenfrequencies, and optionally attenuations, from the vibrational response, each of said eigenfrequencies corresponding to a vibrational mode of said solid piece; and obtaining for at least one vibrational mode: an eigenfrequency shift by comparing one of the set of extracted eigenfrequencies corresponding to said vibrational mode to a reference eigenfrequency value of said vibrational mode, thereby detecting the deviating AM process behaviour. The detection method preferably comprises extracting a set of attenuations from the vibrational response, each of said attenuations corresponding to an eigenfrequency of said set of eigenfrequencies and, for at least one eigenfrequency, computing at least one damping parameter from an attenuation corresponding to said eigenfrequency, thereby obtaining a microcrack quantity value of the solid piece, Herein, the eigenfrequency shift refers to a change of an eigenfrequency peak in the response as observed in the frequency domain. This change can be a difference in the peak frequency of a vibrational mode between the extracted eigenfrequency and the reference eigenfrequency, but can also refer to a change in the peak width. In the latter case, the eigenfrequency shift can for instance be quantified by looking at the change of frequencies at half the peak height. A widened peak tends to indicate increased dampening due to increased internal friction, which could be caused by microcracks.

Figure 1:
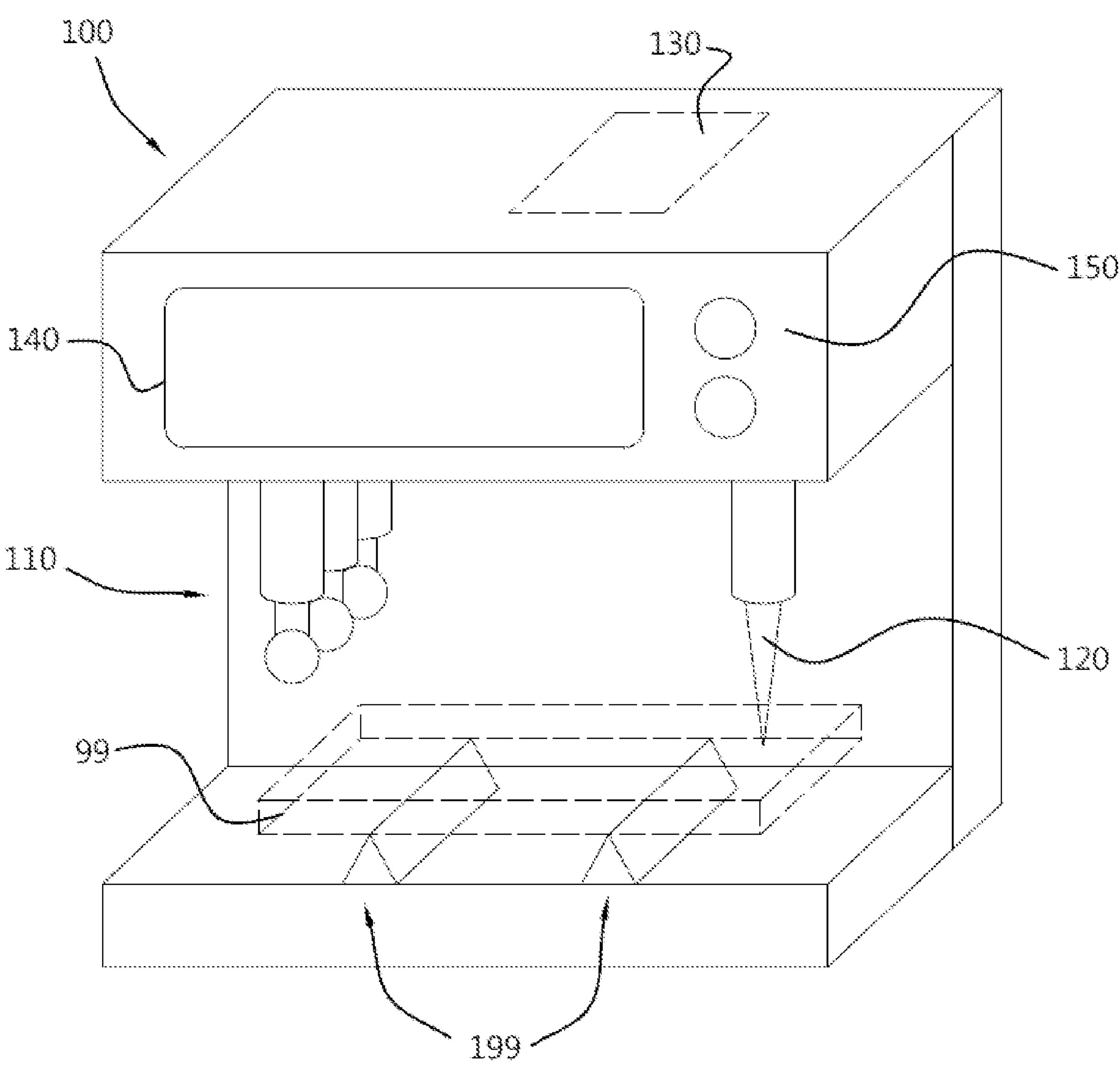

The system for obtaining the response may comprise an apparatus for analyzing a mechanical vibratory response of a solid material sample, an embodiment of which is schematically illustrated in FIG. 1. This embodiment can be used to test 3D solid pieces by placing the solid piece on the sample holder. The apparatus 100 comprises at least one impactor (i.e., one or more impactors) 110 arranged to impart an impact on respective well-defined points on the surface of the solid material sample 99. Without loss of generality, an apparatus 100 with a single impactor 110 is illustrated. The apparatus 100 further comprises a sensor 120 configured to capture the mechanical vibratory response of the sample 99 as a time-varying signal, subsequent to an impact of the at least one impactor 99. A suitable sample holder 199, for example comprising linear supports, is provided to allow the sample 99 to freely vibrate upon impact. The apparatus 100 further comprises processing means 130 configured to analyze the time-varying signal to determine the frequencies and decay constants of sinusoids making up the time-varying signal. The impactors 110 may comprise one or more hammers that are preferably attached to the rest of the apparatus and automatically operated (i.e., weights mounted on an actuated, optionally spring-loaded arm) or other projectiles. The sensor 120 may comprise a contact-based sensor such as a piezoelectric sensor, a non-contact-based sensor such as a microphone or a laser vibrometer, or an accelerometer. Good results can be obtained with a contact-based sensor such as a piezoelectric sensor, but also with a microphone, laser vibrometer or accelerometer. The piezoelectric sensor may be arranged in a probe that may further include a signal amplifier, means to illuminate a spot where the mechanical vibratory response is captured (e.g., a small laser source arranged to illuminate the anticipated point of contact with a spot of light as the probe is brought towards the surface of the sample), and/or a temperature sensor. The probe is preferably equipped with means to measure the force applied by the sensor on the sample. The apparatus may include means to automatically bring the probe in contact with the sample, such as an actuated arm or a more complex robotic support. In this case, the force measuring means provide the necessary feedback to ensure a good contact between the sensor and the sample. If the probe is to be handled manually be the user, the apparatus may be configured to provide visual and/or auditory feedback to help the user keep the contact force within a predetermined target range (for example, an LED may be made to light up in one color when the applied force is too high, and in another color when it is too low; an intermittent beeping sound may have a different pitch or period depending on whether the applied force is too high or too low; etc.). Where the apparatus comprises more than one impactor, these may be arranged for example as a linear array or as a rectangular grid. In the linear case, the apparatus may act as a scanner, moving the sample under the line of impactors for consecutive tests on different parts of the sample, or moving the line of impactors across the sample for consecutive tests on different parts of the sample. The apparatus is preferably equipped with precisely controllable motors to provide the required relative movement of the sample and the impactors. Where the impactors are arranged as a grid, such relative movement will only be necessary if the extent of the grid does not cover the entire area of interest of the sample. The apparatus preferably comprises means to determine geometric properties of the solid material sample (not illustrated), such as a 3D scanner, a camera (optionally stereoscopic), or the like. As is clear from the formulas provided above, accurate knowledge of the geometry of the sample is important to derive the correct values of the Young's modulus and the shear modulus from the detected frequency peaks. A scale (not illustrated) may be integrated in the apparatus to determine the weight, and hence the mass, of the sample. As is clear from the formulas provided above, accurate knowledge of the mass of the sample is also important to derive the correct values of the Young's modulus and the shear modulus from the detected frequency peaks. The apparatus 100 may comprise a conventional user interface, which may include a screen 140 (preferably a touch-screen), buttons or dials 150, a keypad (not illustrated), and the like.

Figure 2:
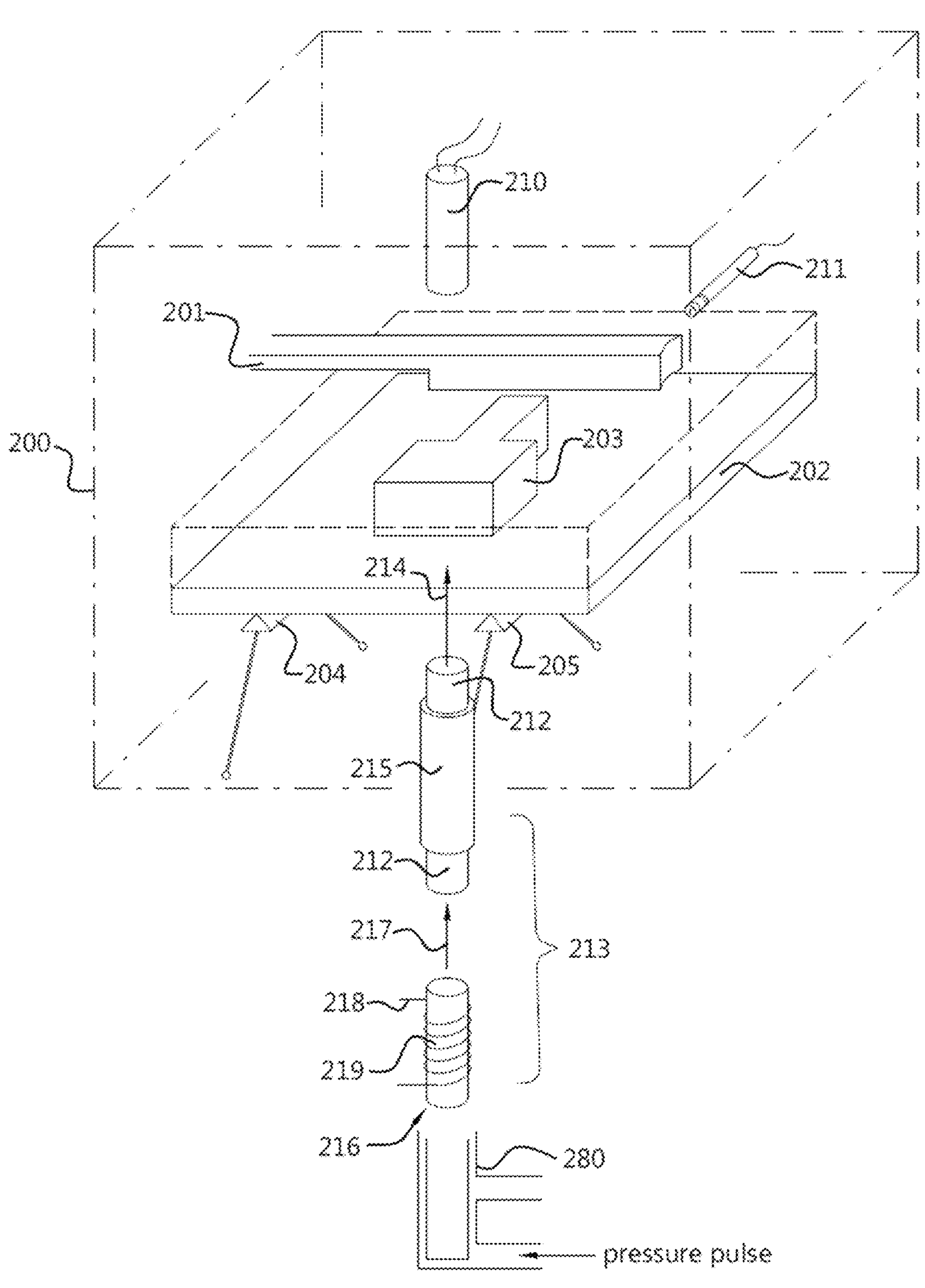

If an in-situ measurement on the solid piece is envisioned, a preferred embodiment of an apparatus for analyzing a mechanical vibratory response of a solid material sample is illustrated in FIG. 2. The apparatus can be positioned in and around a 3D printing chamber (200) with a printing head (201). The apparatus comprises a printing plate (202) onto which one or more solid pieces (203) may be additionally manufactured. The printing plate (202) is suspended by a support structure (204, 205) which allows the test piece to vibrate as freely as possible, e.g. by supporting at the location of vibrational nodes of the test piece. An acoustic sensor (210.211), or multiple acoustic sensors (210,211), which may comprise a microphone or a laser-interferometer, can be placed within the 3D printing chamber to obtain the vibrational response of the solid piece to an impact.

In a preferred embodiment, the acoustic sensor comprises a laser interferometer. A laser interferometer is particularly useful for measurements in vacuum, and allows contactless measurements. Alternatively or additionally, the acoustic sensor may comprise an ultrasonic measurement sensor and/or a time-of-flight sensor and/or a Doppler-based sensor, for instance as described in:

S-R. Huang. R. M. Lerner, K. J. Parker, "Time domain Doppler estimators of the amplitude of vibrating targets". J. Acous. Soc. Am., 91(2), 965-974 (1992);

J. Tapson, "High precision, short range ultrasonic sensing by means of resonance mode-locking", Ultrasonics, 33, 6, 441-444 (1995)), and in R. Kazys, R. Sliteris, L. Mazeika, "Ultrasonic technique for Vibration Measurements", Proceedings of the 15th World Conference on Non-Destructive Testing, 15-21 Oct. 2000 in Rome, https://www.ndt.net/article/wcndt00/papers/idn246/idn246.htm.

Also these types of sensor may be used for contactless measurements.

In an embodiment, the method of the present invention is performed whereby the 3D printing chamber comprises a pressure which is lower than the atmospheric pressure, preferably 0.5 bar or less, more preferably 0.2 bar or less, most preferably essentially a vacuum pressure. Hereby, preferably a laser interferometer is used to allow contactless vibrational measurement at low to zero pressure. Measurements at reduced to zero pressure dampen surrounding noises, thereby increasing the signal-to-noise ratio.

The apparatus preferably comprises an impact system, which comprises a ballistic impactor (212) which can be provided with an impulse by an impactor actuator (213). The ballistic impactor (212) can be a ceramic rod or metal rod. It can be shot upwards (214) towards the test piece using the impactor actuator (213), which comprises:

- a guiding tube (215) through the bottom of the heating chamber, for guiding the ballistic impactor along a preferably vertical direction;
- an electromechanically operated hammer (216) arranged to impart a, preferably vertical, impulse (217) to the impactor (212). The hammer (216) may comprise an electrical coil (218) and a movable rod or bullet (219) which can move depending on the electrical current flowing through the coil (218). An example of such a system is presented in U.S. Pat. No. 6,782,970 B2, whereby in the present invention the bullet of the impactor actuator imparts an impulse to the ceramic impactor (212) rather than directly to the test piece. Alternatively, a pressure-driven impactor or a pressure-driven impact actuator (280) for imparting an impulse to the impactor may be used.

The impactor actuator is arranged to provide an impulse to the ballistic impactor. Preferably, a noise measuring step is performed, whereby the ballistic impactor is brought up to within 2 cm below the printing plate or solid piece, but without touching the printing plate or solid piece. The impactor actuator is then preferably arranged to provide an impulse to the ballistic impactor which brings it into contact with the printing plate or solid piece and thereby mechanically induces a vibrational excitation to the printing plate and/or solid piece.

The vibrational response of the solid piece is a time-varying signal which can be obtained via a vibrational sensor. The vibrational response can then be further analyzed. Thereto, the system of the present invention preferably comprises a processing means which is configured to analyze the time-varying signal to determine the frequencies and decay constants of sinusoids making up the time-varying signal, i.e. it solves a harmonic inversion problem. The problem of a harmonic inversion, which more generally consists of determining frequencies, decay constants, amplitudes, and phases of the sinusoids making up a discrete-time, finite-length signal that consists of a sum of a finite number of such sinusoids in a given bandwidth, is well known in literature, but is rarely associated with impulse excitation techniques (IET). Vladimir A. Mandelshtam and Howard S. Taylor have described the use of the general filter-diagonalization method of Wall and Neuhauser to solve this problem by recasting the harmonic inversion problem as the one of a small matrix diagonalization in their seminal paper "Harmonic inversion of time signals and its applications", The Journal of Chemical Physics 107, 6756 (1997). Computer-based implementations of this technique are known in the art, including the "Harminv" program by Steven G. Johnson of the Massachusetts Institute of Technology. The result of the analysis may be output to the screen 140 or to any other suitable interface for storage or further processing by other equipment. The processing means may consist of one or more dedicated hardware components (e.g. ASIC), appropriately configured configurable hardware components (e.g. FPGA), microprocessors provided with suitable software, or a combination of the above. The same components may also perform other functions.

Hence, a vibrational response of the solid piece to the impact in the frequency domain can be obtained. From this response, a set of eigenfrequencies, and optionally attenuations, can be extracted, each of said eigenfrequencies corresponding to a vibrational mode of said solid piece. For at least one vibrational mode, and preferably two or more vibrational modes, more preferably all vibrational modes, an eigenfrequency shift can be obtained by comparing one of the set of extracted eigenfrequencies corresponding to said vibrational mode to a reference eigenfrequency value of said vibrational mode, thereby detecting the deviating AM process behaviour. As indicated before, an eigenfrequency shift may comprise a change in the width of the peak in the response, which e.g. could be quantified by looking at the change of frequencies at half the peak height. In case a set of attenuations are extracted for said eigenfrequencies, one or more damping parameters can be computed from one or more of said attenuations. From these damping parameters one can deduce the a value indicative of the microcrack quantity in the solid piece. Microcracks and picro-crack propagation play a pivotal role in the fatigue-life time and breaking strength performance of AM produced pieces. Without wishing to be bound by theory, it is believed that microcracks cause internal friction in the AM material, which leads to attenuation of vibrations, and in particular attenuation of eigenfrequencies in the vibration response to an impact. Microcracks outreach spherical voids which do not give rise to extreme stress concentrations, i.e. although voids lead to increased porosity, they are less important for the long-term strength of the solid piece than microcracks.

In a preferred embodiment, the reference eigenfrequency value is obtained from a database. This database may preferably be obtained by measured eigenfrequencies on solid pieces of various shapes and sizes and of the same material as the solid piece which is additively manufactured. The reference eigenfrequency value can then be obtained via direct comparison with a value from the database related to a solid piece of the same shape, size and material, or via an interpolation value obtained on the basis of values from the database. Alternatively, or additionally, the reference eigenfrequency may be obtained from an eigenfrequency trajectory. This eigenfrequency trajectory may preferably describe the eigenfrequency of a solid piece with a determined cross section, in function of the height of the solid piece. The height hereby refers to a size of the solid piece as measured in a direction perpendicular to the cross section. For instance, the solid piece may have a rectangular cross section of width w and length 1, and the eigenfrequency trajectory then describes the dependence of the eigenfrequency of the solid piece on the height thereof. Alternatively, or additionally, the eigenfrequency trajectory may be obtained from calibration measurements. Hereby, the eigenfrequency trajectory can be determined via a set of eigenfrequency measurements performed at different moments during a calibration AM process of a calibration piece, which is essentially the same as the solid piece, i.e. it is made from the same material, with the same size and shape. The quality of the calibration piece can be checked thoroughly, and if approved, the eigenfrequency measurements obtained during the production of the calibration piece, can be used to construct the eigenvalue trajectory. The eigenvalue trajectory can be constructed in function of one or more characteristics of the calibration piece and/or the calibration AM process. Preferably these characteristics comprise any or any combination of the following:

- moment of the measurement within the AM process, e.g. duration between the start of the AM process and the measurement, optionally taking into account dead periods during the AM process, i.e. periods during which the AM process has stopped or slowed down;

size of the calibration piece at the time of the measurement, e.g. by obtaining one or more sizes of the calibration piece and/or solid piece at the time of the measurement. These one or more sizes can preferably be obtained by a size measurement.

If a solid piece is being manufactured, an eigenfrequency value obtained for the solid piece during the AM process can be compared with an eigenfrequency value on the eigenfrequency trajectory at the corresponding characteristics. For instance, if the AM process for the solid piece follows the same procedure as the AM process for the calibration piece, the eigenfrequency value obtained for the solid piece at time T needs to be compared with the reference eigenfrequency value obtained from the eigenfrequency trajectory at the same time T. If the AM process for the solid piece does not follow the same procedure as the AM process of the calibration piece, the characteristics preferably comprise one or more sizes. In this case, the eigenfrequency value obtained for the solid piece when it has a particular size can be compared with the eigenfrequency trajectory for that particular size.

Figure 3A:
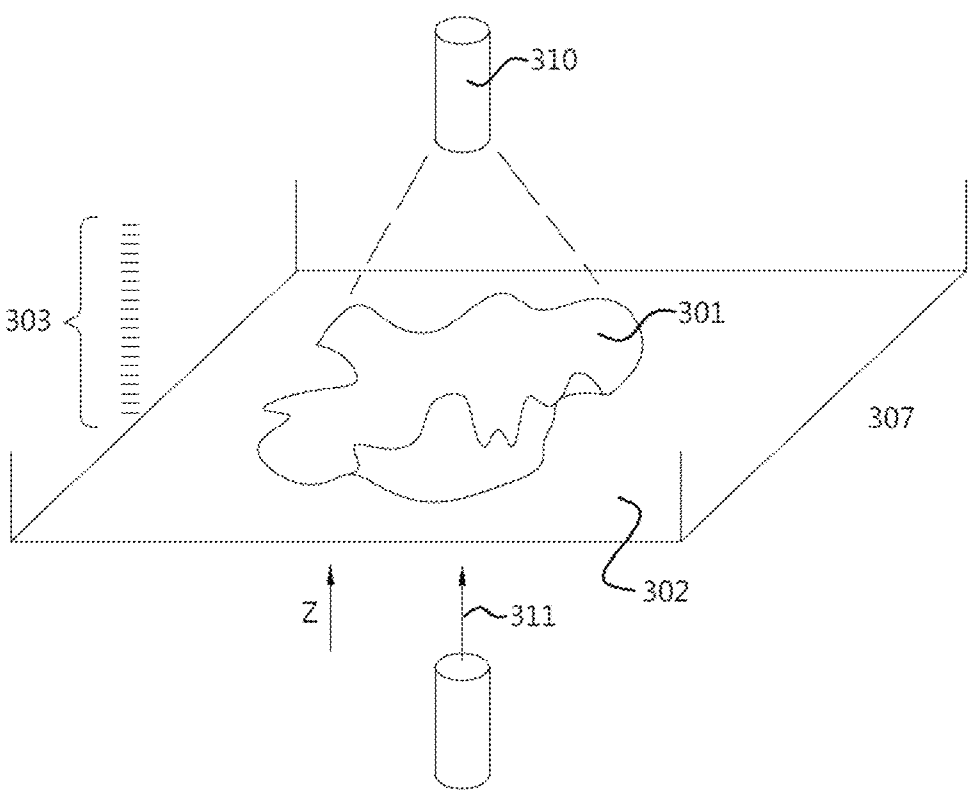
Figure 3B:
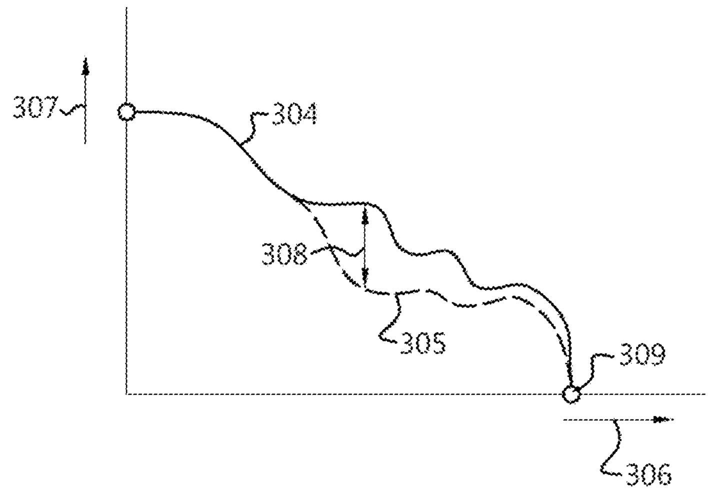

This embodiment is illustrated in FIGS. 3*a* and 3*b*. In FIG. 3*a*, a solid piece (301) is being 3D printed on a printing plate (302). A number of frequency measurements using an impact excitation technique are performed at regular intervals, corresponding to certain heights (303) for the 3D printed piece (301). The results can be illustrated by FIG. 3*b*, where we show a reference eigenfrequency trajectory (304) in function of the height (306) of the solid piece being printed, as well as the measured eigenfrequencies (305) in function of said height (306). A deviation between the eigenfrequency values, i.e. an observed eigenfrequency shift (308), indicates deviating process behaviour at a specific height. Note that it is possible that at full height (309), the frequency shift may vanish, even if the shift was present at intermediate height, indicating the importance of performing many measurements at different heights for a full monitoring. At the same time, a damping parameter of the eigenfrequency can be computed from the attenuation of the vibrational response at this eigenfrequency. One particular advantage of looking at the attenuation is that it is not expected to change much during production of the solid piece, i.e. if the solid piece is being produced, its eigenfrequencies change, but the attenuation at the eigenfrequencies should remain fairly constant or at most change very slowly. Strong deviations in attenuation, which can be seen in strong changes of the damping parameter as the solid piece is printed, e.g. a jump in the damping parameter value when the solid piece reaches a certain height may indicate a high quantity of microcracks at that height.

Note that the eigenvalue trajectory can be based on the database as described above, or on measured eigenfrequencies on solid pieces of various shapes and sizes and of the same material as the solid piece which is additively manufactured. Embodiments wherein the reference eigenfrequency value is at least partially obtained from an eigenfrequency trajectory are particularly apt in observing deviating AM process behaviour, in particular in-situ and/or in real time.

In an embodiment, the reference eigenfrequency value may be obtained by a numerical computation and/or simulation. Note that such computation and simulation may be combined with measurements of the eigenfrequency values of solid pieces or of calibration pieces, in order to obtain the best reference eigenfrequency value.

In a preferred embodiment, the deviating process behaviour which is detected is related to a badly sintered portion of the solid piece. Badly sintered portions lead to changes in vibrational parameters. Without wishing to be bound by theory, we believe that a bad sintering process has a large effect of the stiffness of the solid piece, typically a reduction of stiffness, which can be observed in the different material parameters, such a moduli (Young's modulus, shear moduli, . . . ) and damping coefficients. These material parameters are closely connected to the acoustic response of a piece to mechanical impact. Hence, the present invention is particularly apt in detecting bad or incomplete sintering of a 3D printed solid piece.

In the present invention, the extracted eigenfrequencies correspond to vibrational modes of the solid piece. The vibrational modes can be any mode giving information on the distributed mechanic elastic behaviour of the solid piece. In a preferred embodiment, the vibrational modes may comprise any or any combination of a flexional mode, a torsional mode, a longitudinal vibration mode, or any harmonics thereof, such as the $1^{st}$, $2^{nd}$, $3^{rd}$ harmonic, more preferably the $1^{st}$ harmonic of the flexional mode, the $2^{nd}$ harmonic of the flexional mode, the $1^{st}$ harmonic of the torsional mode, the $2^{nd}$ harmonic of the torsional mode, the $1^{st}$ harmonic of the longitudinal vibrational mode.

In a preferred embodiment, the vibrational modes comprise a torsional mode and/or any harmonics thereof.

In an embodiment, the deviating process behaviour is detected by obtaining one or more eigenfrequency shifts and/or by taking into account a peak width in the extracted vibrational response.

The present invention also relates to a calibration method, comprising the following steps:

a) forming a set of solid pieces on a printing plate by 3D printing;
b) detecting deviating process behaviour in any of the solid pieces using a method as described above, thereby obtaining positional information of said deviating process behaviour;
c) calibrating the 3D printing apparatus taking into account the positional information of the deviating process behaviour on the 3D printing apparatus.

The solid pieces which are used to obtain positional information are also referred to as calibration pieces.

In a preferred embodiment, the set of solid pieces may be arranged in a predefined pattern, preferably a matrix pattern, with respect to the printing plate. This allows obtaining positional information of the deviating process behaviour in the X-Y position of the printing plate. This is preferably done by identifying in which solid piece the deviating process behaviour occurs. There are a number of ways this identification can be done:

the impact may be provided to each solid piece separately, and the vibrational response of said solid piece may be obtained. This process may preferably be repeated for two or more, preferably each, of the solid pieces;

the impact may be provided to two or more solid pieces simultaneously, preferably to all solid pieces simultaneously, and the responses of said two or more solid pieces may be obtained, e.g. using a set of vibrational sensors;

the solid pieces of the set may preferably comprise distinct reference eigenfrequency values, preferably uniquely distinct eigenfrequency values. This may be achieved for instance, by solid pieces having different cross sections and/or different material properties.

Hereby, the impact may be provided to two or more, preferably all, solid pieces simultaneously. The distinct eigenfrequency values of the solid pieces then allow to obtain the vibrational response of the two or more, preferably all, solid pieces essentially simultaneously.

In addition, from the vibrational response, a set of damping parameters can be computed which provides further information on the solid pieces and on deviations from an ideal AM process, in particular with respect to the microcrack quantity.

The predefined pattern may preferably be a rectangular matrix pattern in a x-y plane which is preferably a horizontal plane.

Figure 4:
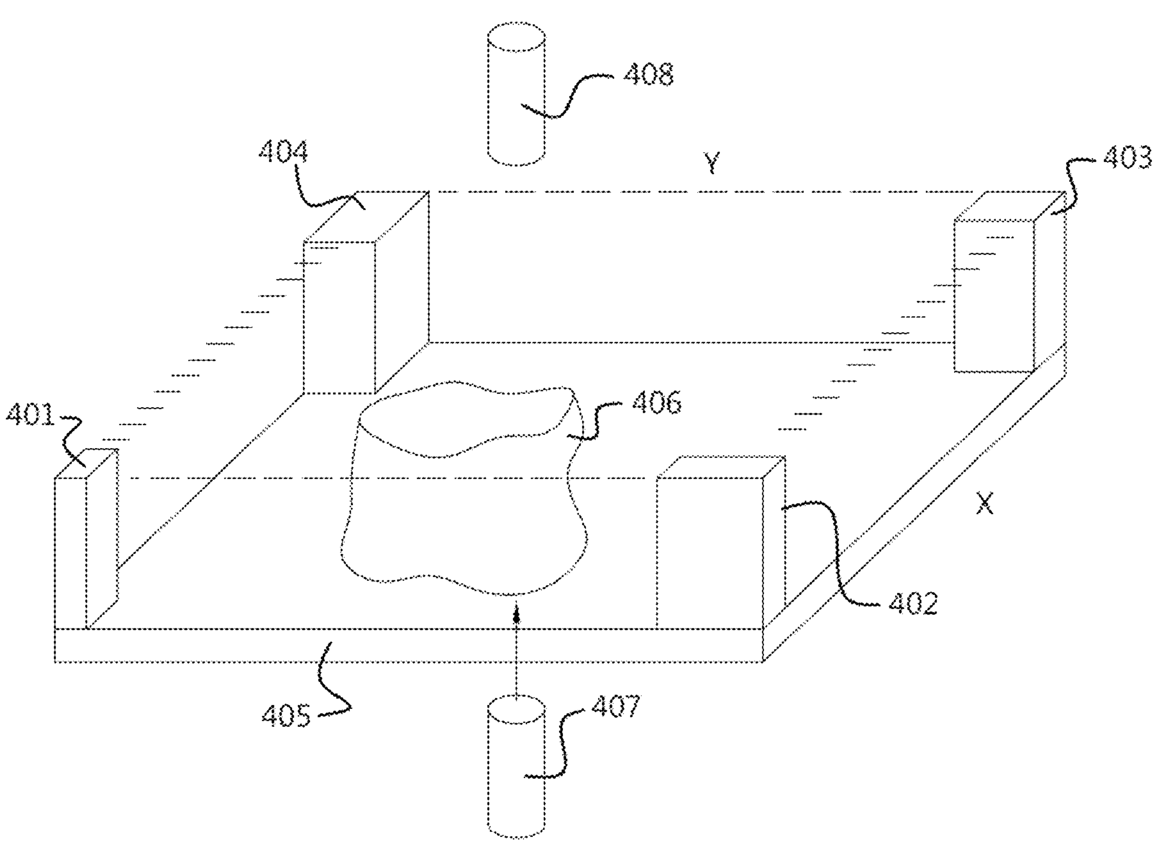
FIG. 4 shows an exemplary embodiment of the method according to the present invention.

An exemplary embodiment of the method according to the present invention is illustrated in FIG. 4. A set of solid pieces (401,402,403,404,406) is being 3D printed on a printing plate (405). In the figure, four of these solid pieces (401,402,403,404) are being printed at the corners of the printing plate, but other configurations can also be used. These four corner solid pieces act as calibration pieces. In a calibration printing run, the four solid pieces are being printed without any further solid pieces being 3D printed. Eigenfrequency measurements for each of the calibration pieces can be performed at regular intervals corresponding to e.g. different heights of the pieces. The pieces may have different cross sections, such that their eigenfrequencies are well separated and can be obtained via single measurement. The measurement can be performed by providing an impact (407) on the printing plate (405) and obtaining the vibrational response with a sensor (408), e.g. a microphone. The obtained eigenfrequencies can be compared with reference cigenfrequencies in order to obtain an eigenfrequency shift indicative of deviating process behaviour. In case of such deviating process behaviour, the 3D printing apparatus can be calibrated and/or recalibrated. Alternatively, or additionally, the eigenfrequency shifts of the solid pieces, and preferably of the calibration pieces, can be obtained by taking the solid pieces from the 3D printing apparatus and perform the method steps on each of the solid pieces, either individually or together. After this frequency shift measurement, the solid pieces may be reintroduced in the 3D printing apparatus, preferably at the same positions as before taking the pieces out. This process can be repeated, e.g. layer by layer or after every n layers being 3D printed.

Hence, the present invention also concerns a method of additively manufacturing a production piece, comprising the step of additively manufacturing said production and a set of calibration solid pieces in the same 3D printing process, and performing a method in accordance with the present invention on one or more of the calibration solid pieces of said set of calibration solid pieces. Hereby, deviating process behaviour observed on the one or more calibration solid pieces is an indication of deviating process behaviour on the production piece. This is particularly helpful if the production piece cannot easily be tested using a method according to the present invention, e.g. because of a lack of knowledge of reference eigenfrequencies or because the production piece comprises a unique and/or intricate shape.

Further, in case of no deviating process behaviour, or after calibration of the apparatus, the measurements of the eigenfrequencies of the calibration pieces at different moments in the printing process and/or at different heights, may serve as reference eigenfrequency values, or they can serve as input to construct a reference eigenfrequency trajectory. This allows printing of any other solid piece (406) together with at least one, but preferably all, of the calibration pieces. By performing the method according to the present invention for detecting deviating process behaviour for any, and preferably each, of the calibration pieces, one can infer if the other solid piece (406) is 3D printed correctly. This can be applied to any type of other solid piece (406), independent of its shape or size or other characteristic. This clearly gives an enormous advantage when printing many different types of solid pieces or solid pieces of intricate shapes and sizes for which it is not easy to obtain reference eigenfrequency values.

After the printing process, the calibration pieces can be further tested for defects to check if the registered eigenfrequencies correspond to well-printed solid pieces. In further runs, the calibration pieces, in this exemplary case the four calibration pieces, can be printed together with any other solid piece to be printed (406).

As described above, the deviating process behaviour can be detected by preferably providing an impact to the printing plate, thereby providing an impact to each of the solid pieces formed thereon. The vibrational response of each of the solid pieces can preferably be obtained simultaneously, separately, subsequently and/or a combination thereof. If the vibrational response of each of the solid pieces is obtained simultaneously, the response is preferably obtained via an acoustic measurement, which can then preferably be frequency-analysed.

In a embodiment, the solid pieces are essentially identical, and the deviating process behaviour is detected by obtaining one or more eigenfrequency shifts and/or by taking into account a peak width in the extracted vibrational response.

The calibration method of the present invention are preferably applied at different moments during the 3D printing process, which also allows to obtain positional information on the deviating process behaviour with respect to the distance from the printing plate. Hence, three-dimensional location information can be obtained.

The set of solid pieces may comprise any or any combination of shapes, such as beams, cylinders, strands, etc.

In a preferred embodiment, the reference eigenfrequency value for a first solid piece of said set is obtained taking into account the extracted eigenfrequencies of at least a second solid piece of said set.

The deviating process behaviour may preferably be due to any or any combination of the following:

- a defect, such as a local defect which can be a point defect, a line defect, a surface defect, a volume defect, a domain defect, a microcrack, a macrocrack, or any combination thereof;
- an overall deviating parameter, such as density, porosity and/or sintering quality,
- a material parameter, such as powder quality and/or powder material variations.

In an embodiment, the solid pieces of the set are each different in a predefined manner, e.g. each solid piece having a different horizontal cross section, a different thickness and/or a different width, and the defect is detected taking into account a eigenfrequency shift in at least one of the test pieces. This allows simultaneous detection of defects in different solid pieces.

In an embodiment, the calibration method is performed multiple times during forming of the set of solid pieces, preferably the calibration method being performed at different heights of the solid pieces. This allows one to obtain information on defect location in three dimensions.

In an embodiment, the calibration method is performed in the 3D printing apparatus, i.e. in situ. Alternatively, the calibration method is performed by taking the solid pieces from the apparatus after being formed or by taking out, measure, remounting and continue to 3D print for a certain height and repeat this process N times with N at least 2, in order to obtain 3D dimensional location information regarding the deviating process behaviour.

In a preferred embodiment, the set of at least one solid piece comprises a production piece and a set of calibration pieces, wherein the calibration method is applied to the set of calibration pieces.

The methods of the present invention may also comprise a step of measuring, or at least obtaining through measurement, a damping parameter of the vibrational response for the vibrational mode, and detecting a defect, preferably a microcrack defect, on the basis of the damping parameter.

Figure 6:
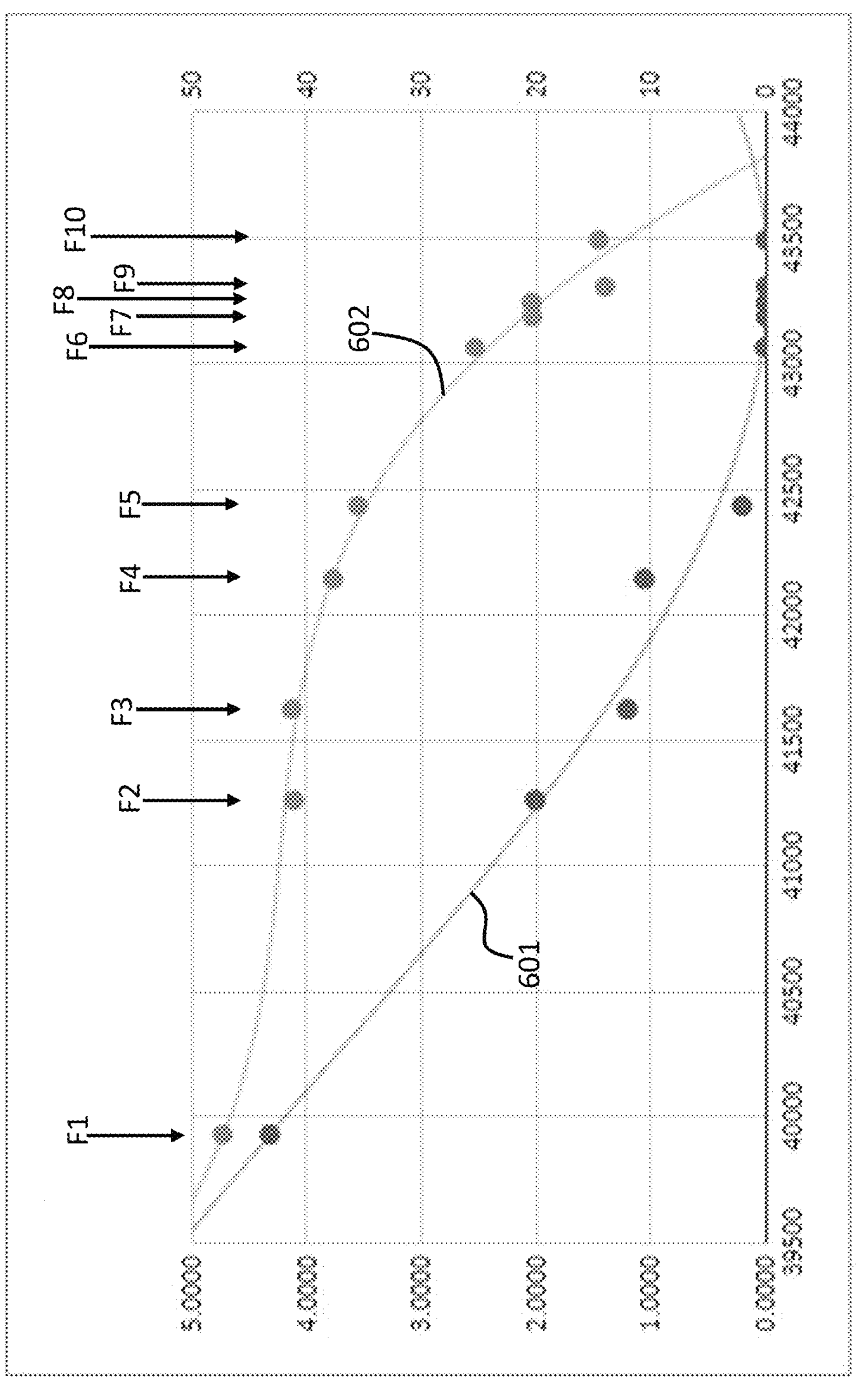
FIG. 6 shows eigenfrequencies and corresponding damping parameters of 10 different AM solid pieces.

FIG. 6 shows eigenfrequencies and corresponding damping parameters of 10 different AM solid pieces which were obtained using the same AM method, i.e. fluctuations between the different pieces arise mainly from statistical variations in the AM method. The results are indicated as dark and light little circles. Each of the 10 pieces was tested for a vibrational mode. The measured eigenfrequencies lie in the range of about 39800 (F1) to 43500 Hz (F10), as can be read from the x-axis. The lower set of (dark grey) circles represent the porosity of the corresponding solid piece, given in percent on the left y-axis. A porosity of 0% means no porosity, i.e. a completely solid piece. Porosities have been directly measured using X-ray micro-CT. The piece having the eigenfrequency of about 43500 Hz (F10) was measured to have a porosity lower 0.01%. whereas the porosity of the piece having a eigenfrequency of about 39800 Hz (F1) was measured to be about 4.3%. The F10 eigenfrequency of about 43500 Hz mat serve as the reference eigenfrequency. A clear correlation is seen on the figure and illustrated by a lower graph (601) which shows a fitted 3rd order curve to the datapoints, i.e. porosity measured by X-ray micro-CT versus measured eigenfrequency. One can see that the higher the shift in eigenfrequency from the reference value (F10), the higher the porosity. Further also note that the current method seems to be very sensitive for very low porosities, as illustrated by the datapoints at frequencies F6, F7, F8, F9 and F10, which all were measured to have very low porosity, but which still show measurable eigenfrequency shifts. This also shows that for high quality pieces having low porosities, the present method still is capable to distinguish between good quality and excellent quality.

For each of the eigenfrequencies, a damping parameter was also measured (top circles in light grey) and plotted. The damping parameter in the present case is the width of the eigenfrequency peak at half maximum in the frequency vibrational response of the corresponding solid piece. The damping parameter shows a dependency on the frequency shift which is essentially increased damping for increasing frequency shifts. However, the frequency shift dependency for the damping parameter is clearly different than for the porosity, indicating that the present method allows to obtain more information than e.g. an X-ray micro-CT porosity measurement, in particular it reveals further information on the microcracks in the solid piece. In this case, we note that, even though the datapoints of the pieces having eigenfrequencies F6, F7, F8, F9 and F10 all show a very small porosity (of less than 0.01%), the damping parameter values range from about 13 to 25.

Note that, additionally or alternatively, one or more damping parameters may be computed, such as for example the width at half maximum of the eigenfrequency peak, a damping frequency, a loss factor, a fraction of critical damping, a quality factor, a decay constant, a time constant, a reverberation time, a decay rate, a logarithmic decrement, etc.

Example 1: Sensitivity of Vibrational Parameters to Localized Defects

In order to illustrate the possibilities which are offered by the method of the present invention, a numerical calculation has been performed to illustrate the sensitivity of the vibrational eigenfrequencies to a localized defect.

The simulated solid piece has the shape of a beam with dimensions length×width×height (L×W×H) of 100 mm×25 mm×10 mm. Several eigenfrequencies of the beam were calculated:

- the flexural base mode (flex), its first and second harmonic;
- torsional base mode (tors), its first and second harmonic, and
- the longitudinal vibration mode (long) and its first harmonic.

A localized small defect of 1 mm×1 mm×1 mm was introduced, after which the same eigenfrequencies were calculated. The small defect was located in 4 different positions:

- a corner defect (near one of the vertices of the beam)
- a center defect in the middle of the beam
- a mid zeroline defect, positioned at half of the width and half of the height, but at 0.25 of the length
- a border zeroline defect, positioned at a long edge at 0.25 of the length The resulting eigenfrequencies are compared in the tables below (frequencies are given in Hz., relative shift in %):

| Mode | Freq. no defect | Freq. corner defect | shift | Relative shift |
|---|---|---|---|---|
| Flex base | 9396.10 | 9415.90 | 19.80 | 0.21 |
| Flex 1$^{st}$ order | 24552.00 | 24754.00 | 202.00 | 0.82 |
| Flex 2$^{nd}$ order | 44989.00 | 45636.00 | 647.00 | 1.44 |
| Tors base | 19348.00 | 19819.00 | 471.00 | 2.43 |
| Tors 1$^{st}$ order | 39015.00 | 40017.00 | 1002.00 | 2.57 |
| Tors 2$^{nd}$ order | 59296.00 | 61097.00 | 1801.00 | 3.04 |
| Long base | 47136.00 | 47138.00 | 2.00 | 0.004 |
| Long 1$^{st}$ order | 93640.00 | 93652.00 | 12.00 | 0.013 |

| Mode | Freq. no defect | Freq. center defect | shift | Relative shift |
|---|---|---|---|---|
| Flex base | 9396.10 | 9415.90 | 19.80 | 0.21 |
| Flex 1$^{st}$ order | 24552.00 | 24667.00 | 115.00 | 0.47 |
| Flex 2$^{nd}$ order | 44989.00 | 45456.00 | 467.00 | 1.03 |
| Tors base | 19348.00 | 19766.00 | 418.00 | 2.11 |
| Tors 1$^{st}$ order | 39015.00 | 39934.00 | 919.00 | 2.30 |
| Tors 2$^{nd}$ order | 59296.00 | 60925.00 | 1629.00 | 2.67 |
| Long base | 47136.00 | 47133.00 | −3.00 | −0.006 |
| Long 1$^{st}$ order | 93640.00 | 93651.00 | 11.00 | 0.012 |

| Mode | Freq. no defect | Freq. mid zeroline defect | shift | Relative shift |
|---|---|---|---|---|
| Flex base | 9396.10 | 9413.00 | 16.90 | 0.18 |
| Flex 1$^{st}$ order | 24552.00 | 24715.00 | 163.00 | 0.66 |
| Flex 2$^{nd}$ order | 44989.00 | 45510.00 | 521.00 | 1.14 |
| Tors base | 19348.00 | 19801.00 | 453.00 | 2.29 |

-continued

| Mode | Freq. no defect | Freq. mid zeroline defect | shift | Relative shift |
|---|---|---|---|---|
| Tors $1^{st}$ order | 39015.00 | 39955.00 | 940.00 | 2.35 |
| Tors $2^{nd}$ order | 59296.00 | 60948.00 | 1652.00 | 2.71 |
| Long base | 47136.00 | 47136.00 | 0.00 | 0.00 |
| Long $1^{st}$ order | 93640.00 | 93640.00 | 0.00 | 0.00 |

| Mode | Freq. no defect | Freq. border zeroline defect | shift | Relative shift |
|---|---|---|---|---|
| Flex base | 9396.10 | 9410.90 | 14.80 | 0.16 |
| Flex $1^{st}$ order | 24552.00 | 24686.00 | 134.00 | 0.54 |
| Flex $2^{nd}$ order | 44989.00 | 45505.00 | 516.00 | 1.13 |
| Tors base | 19348.00 | 19739.00 | 391.00 | 1.98 |
| Tors $1^{st}$ order | 39015.00 | 39843.00 | 828.00 | 2.08 |
| Tors $2^{nd}$ order | 59296.00 | 60979.00 | 1683.00 | 2.76 |
| Long base | 47136.00 | 47136.00 | 0.00 | 0.00 |
| Long $1^{st}$ order | 93640.00 | 93640.00 | 0.00 | 0.00 |

One can notice the sensitivity of certain modes to the localized defects, in particular to for instance the torsional base mode, torsional 1st order mode and torsional 2nd order mode.

Example 2: Measurement on 3D Printed Lattice Structures

Figures 5A, 5B:
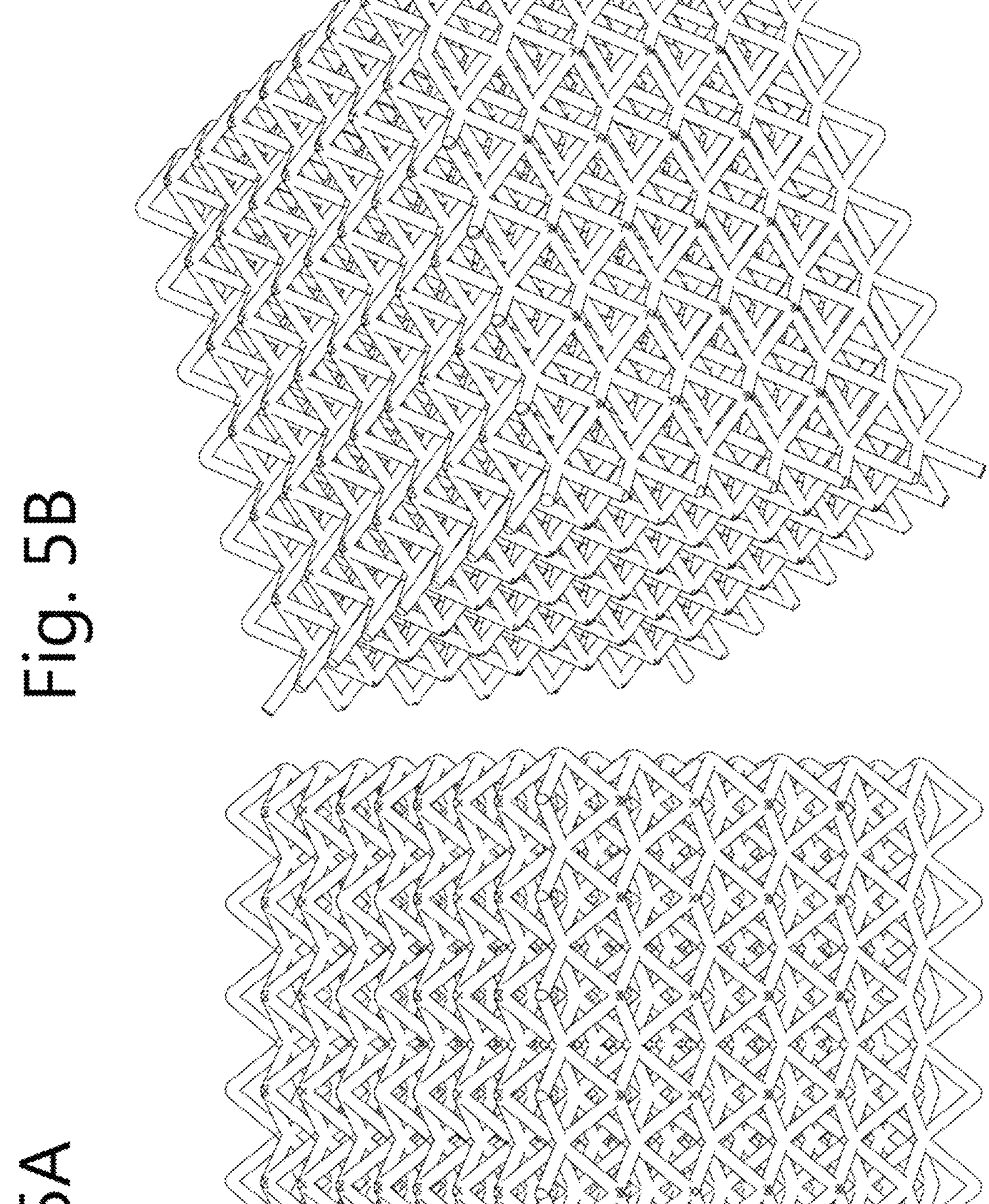
FIGS. 5A and 5B illustrate a set of open cube-shaped lattice structures which were 3D printed. Two sets of lattice structures, which were tested in accordance with the present invention.

The method of the present invention was also applied to a set of open cube-shaped lattice structures which were 3D printed. Two sets of lattice structures, each set comprising 3 lattice structures, were tested. The lattice structures within a set had the same lattice type, while lattice structures from different sets had different lattice structures. The lattice structure of the first set is shown in FIG. 5*a*, the lattice structure of the second set is shown in FIG. 5*b*.

The structures have been measured by means of Archimedes Measuring Method (Archi), two types of Gas Pycnometry and Impedance measurement by Foucault Current Measurement. Those methods confirm that both groups of 3 cubes occupy the same volume, have the same electrical resistance and all 6 have the same material density. However the method of the present invention reveals the following: The first set of 3 identical cubes gives a quite good frequency uniformity (torsional mode). The last cube however shows a wider peak and thus higher damping. indicative of a higher internal friction, most often caused by microcracks. Hence, the present invention allows identifying microcrack defects by a widening of the frequency peak. In this case, the set extracted eigenfrequencies may comprise the peak eigenfrequency and the eigenfrequencies at half the peak height. By looking at the frequency shifts for these three eigenfrequency values, we can deduce the presence of deviating process behaviour, which has possibly resulted in a microcrack.

Furthermore, the second set of 3 cubes shows a very significant difference in resonance behaviour: the first cube has a much higher elasticity compared to the second and the 3rd one, as indicated by the frequency difference ($1^{st}$ cube: 20700 Hz, $2^{nd}$ cube: 21000 Hz, $3^{rd}$ cube: 21150 Hz for the torsional base mode). The inventors deem that the reason for this quite spectacular difference is the sintering quality responsible for better/poorer adhesion of the wires on the matrix points.

Hence, the present invention is observed to be sensitive to deviating process behaviour, with a sensitivity which is better than other methods, such as an Archimedes Measuring Method, Gas Pycnometry and Impedance measurement method.

Note that the method of the present invention requires only about 20s per measurement if manually performed, but can be performed within 2s per measurement in a fully automated in-line mode.

The invention claimed is:

1. A method for non-destructively detecting deviating additive manufacturing (AM) process behavior of a 3D printed solid piece, comprising the steps of:

providing a mechanical impact to the solid piece;

obtaining a vibrational response of the solid piece to the impact in the frequency domain;

extracting a set of eigenfrequencies, and a set of attenuations, from the vibrational response, each of said eigenfrequencies corresponding to a vibrational mode of said solid piece, and each of said attenuations corresponding to an eigenfrequency of said set of eigenfrequencies;

obtaining for at least one vibrational mode:

an eigenfrequency shift by comparing one of the set of extracted eigenfrequencies corresponding to said vibrational mode to a reference eigenfrequency value of said vibrational mode and obtaining a porosity value of the solid piece from said eigenfrequency shift, and for said at least one eigenfrequency, computing at least one damping parameter an attenuation corresponding to said eigenfrequency, thereby obtaining a microcrack quantity value of the solid piece, thereby detecting the deviating AM process behavior and positional information of the deviating AM process behavior, wherein the solid piece is arranged with one or more other solid pieces in a predefined pattern with respect to a printing plate, and the positional information of the deviating process behavior is obtained in a X-Y position of the printing plate by identifying in which solid piece the deviating process behavior occurs.

2. The method according to claim 1, wherein the reference eigenfrequency is obtained from an eigenfrequency trajectory.

3. The method according to claim 2, wherein the eigenfrequency trajectory describes the eigenfrequency of a solid piece with a determined cross section, in function of a height of the solid piece.

4. The method according to claim 2, wherein the eigenfrequency trajectory is determined via a set of eigenfrequency measurements performed at different moments during a calibration AM process of a calibration piece.

5. The method according to claim 1, wherein the extracted eigenfrequencies correspond to vibrational modes of the solid piece, the vibrational modes comprising any or any combination of a flexional mode, a torsional mode, a longitudinal vibration mode, or any harmonics thereof, including the 1st, 2nd, 3rd harmonic, the 1st harmonic of the flexional mode, the 2nd harmonic of the flexional mode, the 1st harmonic of the torsional mode, the 2nd harmonic of the torsional mode, the 1st harmonic of the longitudinal vibrational mode.

6. The method according to claim 1, the vibrational response is obtained by an acoustic sensor.

7. The method according to claim 1, which is applied during an additive manufacturing process for 3D printing the solid piece.

8. A calibration method for calibrating a 3D printing apparatus, comprising the steps of:

a) forming a set of solid pieces on a printing plate by 3D printing;

b) detecting deviating process behavior in any of the solid pieces using a method according to claim 1, thereby obtaining positional information of said deviating process behavior;

c) calibrating the 3D printing apparatus taking into account the positional information of the deviating process behavior on the 3D printing apparatus.

9. The calibration method according to claim 8, wherein identifying in which solid piece the deviating process behavior occurs comprises any or any combination of the following methods:

performing method for non-destructively detecting deviating additive manufacturing (AM) process behavior of a 3D printed solid piece on each solid piece of the set of solid pieces separately, including the steps of:

providing a mechanical impact to the solid piece;

obtaining a vibrational response of the solid piece to the impact in the frequency domain;

extracting a set of eigenfrequencies, and a set of attenuations, from the vibrational response, each of said eigenfrequencies corresponding to a vibrational mode of said solid piece, and each of said attenuations corresponding to an eigenfrequency of said set of eigenfrequencies;

obtaining for at least one vibrational mode:

an eigenfrequency shift by comparing one of the set of extracted eigenfrequencies corresponding to said vibrational mode to a reference eigenfrequency value of said vibrational mode and obtaining a porosity value of the solid piece from said eigenfrequency shift, and for said at least one eigenfrequency, computing at least one damping parameter an attenuation corresponding to said eigenfrequency, thereby obtaining a microcrack quantity value of the solid piece, thereby detecting the deviating AM process behavior;

wherein an impact is provided to two or more solid pieces simultaneously and the responses of said two or more solid pieces may be obtained;

wherein the solid pieces of the set comprise distinct reference eigenfrequency values, wherein the impact is provided to two or more solid pieces simultaneously, wherein the vibrational response of the two or more solid pieces are obtained essentially simultaneously.

10. The calibration method according to claim 8, wherein the calibration method is performed multiple times during forming of the set of solid pieces, the calibration method being performed at different heights of the solid pieces.

11. The calibration method according to claim 8, which is performed in the 3D printing apparatus.

12. The calibration method according to claim 8, wherein the set of at least one solid piece comprises a production piece and a set of calibration pieces, wherein a calibration method is applied to the set of calibration pieces.

13. A 3D printing steering method, comprising performing the calibration method according to claim 8 on a set of at least one solid piece at multiple measurement events during forming of the solid piece, wherein the reference eigenfrequency value at each measurement event is a predefined target reference eigenfrequency for said measurement event, and wherein processing parameters of the 3D printing apparatus are steered on the basis of the eigenfrequency shift.

14. A system for non-destructively detecting deviating additive manufacturing (AM) process behavior of a 3D printed solid piece, comprising:

a mechanical impactor for providing an impact to a solid piece;

a sensor for obtaining a vibrational response of the solid piece to the impact;

processing means configured to:

compute the vibrational response in the frequency domain;

extracting a set of eigenfrequencies and a set of attenuations, from the vibrational response, each of said eigenfrequencies corresponding to a vibrational mode of said solid piece, and each of said attenuations corresponding to an eigenfrequency of said set of eigenfrequencies;

obtaining for at least one vibrational mode: an eigenfrequency shift by comparing one of the set of extracted eigenfrequencies corresponding to said vibrational mode to a reference eigenfrequency value of said vibrational mode and obtaining a porosity value of the solid piece from said eigenfrequency shift, and for at least one eigenfrequency, computing at least one damping parameter from an attenuation corresponding to said eigenfrequency, thereby obtaining a microcrack quantity value of the solid piece, thereby detecting the deviating AM process behavior and positional information of the deviating AM process behavior, wherein the solid piece is arranged with one or more other solid pieces in a predefined pattern with respect to a printing plate, and the positional information of the deviating process behavior is obtained in a X-Y position of the printing plate by identifying in which solid piece the deviating process behavior occurs.

* * * * *